May 10, 1966

H. E. MUSICK ETAL
ELECTRIC CURRENT-SENSING TIME LIMIT
MOTOR ACCELERATION SYSTEM 3,250,944

Filed Feb. 12, 1963

INVENTORS.
HAROLD E. MUSICK
GERALD T. JOHNSTON
LEE J. PENKOWSKI
BY John H Leonard,
their ATTORNEY.

INVENTORS.
HAROLD E. MUSICK
GERALD T. JOHNSTON
LEE J. PENKOWSKI
BY John H. Leonard
their ATTORNEY.

United States Patent Office 3,250,944
Patented May 10, 1966

3,250,944
ELECTRIC CURRENT-SENSING TIME LIMIT
MOTOR ACCELERATION SYSTEM
Harold E. Musick and Gerald T. Johnston, Bedford
Heights, Ohio, and Lee J. Penkowski, Pinellas Park,
Fla., assignors to Square D Company, Park Ridge, Ill.,
a corporation of Michigan
Filed Feb. 12, 1963, Ser. No. 258,011
4 Claims. (Cl. 318—395)

This invention relates to an electric timing device and combination thereof with a control system, and more particularly to a combined time limit and current-responsive control device incorporating semi-conductor elements and a combination thereof with a system for controlling the by-passing, or commutation, of the starting resistance in a motor circuit during acceleration of the motor.

As used in a motor acceleration system, the device normally delays the successive energization of resistance commutating switches for periods determined by the magnitude of the current flowing to the motor, but if the motor fails to accelerate, or accelerates too slowly, the device causes the next successive switch to be energized after a predetermined time regardless of the magnitude of the motor current.

For purposes of explanation, the invention is shown as used in a control system for a direct current series motor, its mode of use in control systems for other types of direct current motors, for alternating current motors when used in conjunction with rectifiers, and for other purposes being apparent from the illustrative example.

Various timing devices and timing systems have heretofore been provided for controlling the commutation of the starting resistance in a motor circuit so that the current taken by the motor during acceleration does not exceed predetermined values. Prior systems which provide definite time delay periods between the closing of each of the commutating switches have the disadvantage that if the time delay periods are properly adjusted for a given load, the periods are too long for lighter loads and too short for heavier loads.

In the well known current limit timing system, relays operative in response to variations in the current in the motor circuit are arranged to operate sequentially to commutate the starting resistance each time the current decreases to a predetermined value. This system has the disadvantage that, when the motor is subjected to an overload sufficient to prevent the motor current from decreasing to the predetermined value, the system cannot force the motor to start from rest or to accelerate fully.

A system of motor acceleration having all of the advantages of the definite time system and the current limit system, and none of the inherent disadvantages of either, is described in United States Letters Patent No. 1,980,736, issued November 20, 1934, and Patent No. 2,073,382, issued March 9, 1937. The timing devices of this prior so-called time-current system, when adjusted to provide proper acceleration of the motor under predetermined operating conditions, also provide, without change or adjustment, proper acceleration of the motor under different conditions, even if abnormal. This type of time-current system gained immediate market acceptance and is still in common use.

The operating coils of prior time-current timing devices carry the full armature current during the acceleration period and thus must be serially connected in the motor armature circuit. It is therefore necessary to use relatively large electrical conductors to supply the armature current to the operating coils. The timing devices are generally assembled with other control components on reinforced panels to form a controller. In controllers using this device, the wiring between the components and the incoming or source leads, as well as the load leads, are connected on the rear of the panels. This is acceptable where floor space is ample and where the controller can be spaced from a stationary wall to permit convenient access to a workman for making connections on the rear of the panel.

Recently, the demand has increased for controllers having electrical components arranged for wiring on the front of the panels. Such front-connected controllers are especially desirable for equipment such as cranes where space is limited. Making a controller completely front-connected not only reduces the depth of the controller itself, but also eliminates the need for working space behind the controller.

In order to use the time-current timing device of the aforementioned patents on front-connected controllers, it would be necessary, since the devices carry the full motor current, to connect them by the undesired relatively large conductors. Because the use of large electrical conductors reduces the flexibility and ease of maintenance of front-connected controllers, it is desirable to keep the number of such conductors to a minimum.

It is, therefore, an object of this invention to provide a time-current control system in which it is not necessary for the timing devices to carry the full motor current and consequently they are not required to be connected by relatively large conductors, but instead, can be connected by readily flexible control wires.

It is a further object to provide a new and improved system of motor control, and an improved timing device therefor, having all of the advantages of the definite time systems and the current limit systems with none of the inherent disadvantages of either.

Another object is to provide an improved motor controller timing device which can be adjusted to provide proper acceleration of the motor under normal operating conditions and which, without change or adjustment, can provide proper acceleration of the motor under different or changing conditions and under abnormal operating conditions.

Another object is to provide a motor control system incorporating an improved timing device, or devices, in which the time delay interval, or intervals, are substantially constant only for a given load on the motor, and in which the time delay intervals vary in response to variations in the motor load, the time delay intervals being relatively long when the load is relatively large and relatively short when the load is relatively small.

A still further object is to provide a motor control system incorporating a time delay device in which the time delay interval is determined by the time required for the motor current to decrease to a predetermined value during acceleration, but which interval terminates within a safe predetermined time even if the motor current does not decrease to that value.

Other objects and advantages of the invention will become apparent from the following specification, wherein reference is made to the drawings, in which.

Figure 1:
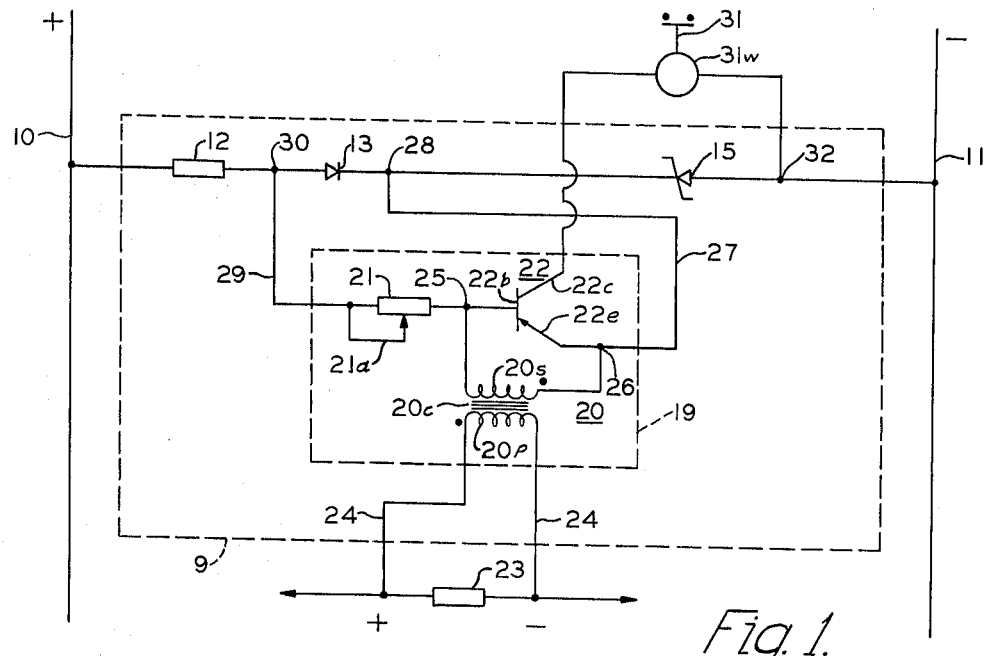
FIG. 1 is a schematic wiring diagram of a time delay device according to the present invention.

Referring first to FIG. 1, a form of a time delay device, indicated generally at 9, in accordance with this invention and adapted to be used in a control system for a direct current motor is shown for purposes of illustration. A suitable source of direct current (not shown) is provided for energization of supply conductors 10 and 11. The conductor 10 is positive and the conductor 11 is negative, as indicated. In the device 9, a resistor 12, a unidirectional current-conducting diode 13, and a zener diode 15 are serially connected with each other in the order recited to define a series circuit. This series circuit is connected across the conductors 10 and 11.

Also included in the device 9 is an electro-responsive unit 19 comprising a saturable transformer 20 having a core 20c, a primary winding 20p, and a secondary winding 20s; an adjustable resistor 21; and a transistor 22 having a base 22b, a collector 22c, and an emitter 22e. The dots near the windings 20p and 20s indicate that the ends of the windings adjacent the respective dots will have the same polarity whenever the transformer 20 is energized. The primary winding 20p is arranged to be connected across a calibrated shunt 23, such as a resistor of extremely low ohmic value, by conductors 24, the shunt 23 being arranged to be further connected in a controlled circuit to supply a voltage signal, as will be described. One terminal of the secondary winding 20s is connected at a junction 25 to a common interconnection of the resistor 21 and the base 22b of the transistor 22 and the other terminal of the winding 20s is connected at a junction 26 to the emitter 22e of the transistor 22. The junction 26 is connected by a conductor 27 to a junction 28 in the series circuit between the diode 13 and the zener diode 15. A conductor 29 connects one terminal of the resistor 21 to a junction 30 in the series circuit between the resistor 12 and the diode 13. The collector 22c of the transistor 22 is arranged to be connected to one terminal of an operating winding 31w of a relay 31. A junction 32 in the series circuit between the zener diode 15 and the conductor 11 is arranged to be connected to the other terminal of the winding 31w.

Figure 2:
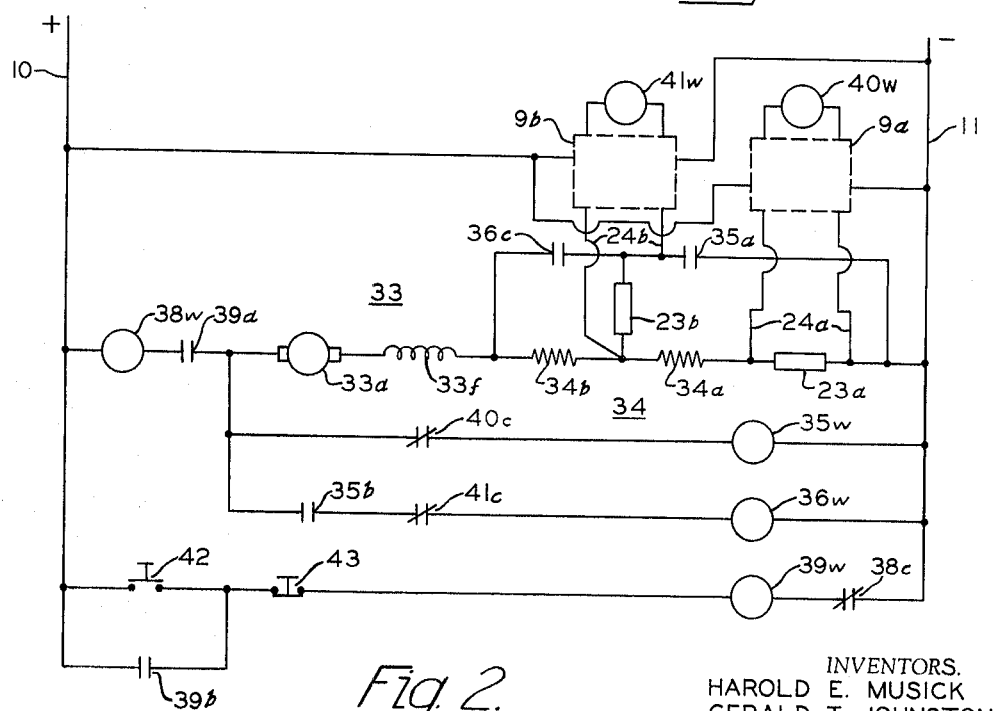
FIG. 2 is a schematic wiring diagram of an electric motor control system including two of the time delay devices of FIG. 1.

Referring now to FIG. 2, a direct current motor 33 having an armature winding 33a and a series field winding 33f is connected across the conductors 10 and 11 in series with an accelerating resistor 34 having serially-connected portions 34a and 34b. The resistor portions 34a and 34b are shunted, respectively, by by-pass circuits including normally-open contacts 35a and 36c, respectively, of electromagnetic contactors 35 and 36. These contactors have operating windings 35w and 36w, respectively. Shunts 23a and 23b, each similar to the shunt 23 of FIG. 1, are connected in loop circuits with respect to the contacts 35a and 36c. The shunt 23a is connected between one end of the resistor portion 34a and the conductor 11, and the shunt 23b is connected between the common terminals of the resistor portions 34a and 34b and a common connection between the contacts 35a and 36c. An operating winding 38w of an overload relay 38, having a normally closed contact 38c, and a normally-open contact 39a of a main electromagnetic contactor 39, having an operating winding 39w, are serially connected between the armature winding 33a and the conductor 10.

A timing device 9a, similar to the device 9 of FIG. 1, is connected across the conductors 10 and 11, and conductors 24a of the device 9a are connected across the shunt 23a in the manner indicated in FIG. 1. An operating winding 40w of a relay 40 having a normally-closed contact 40c and corresponding to the relay 31 is connected for energization by the device 9a. The contact 40c of the relay 40 is serially connected with the operating winding 35w of the contactor 35. The series connected contact 40c and the operating winding 35w are connected between the conductor 11 and the junction of the armature winding 33a and the contact 39a.

A second timing device 9b, similar to the device 9 of FIG. 1, is also connected across the conductors 10 and 11 in the manner indicated in FIG. 1. Conductors 24b of the device 9b are connected across the shunt 23b. An operating winding 41w of a relay 41 having a normally-closed contact 41c and corresponding to the relay 31 is connected for energization by the device 9b. The contact 41c of the relay 41 is serially connected with the operating winding 36w of the contactor 36 and with a normally-open contact 35b of the contactor 35. The serially-connected winding 36w, the contact 41c, and the contact 35b are connected between the conductor 11 and the junction of the armature winding 33a and the contact 39a.

The circuit of FIG. 2 further includes a start push-button 42 and a stop push-button 43 connected to control the operating winding 39w of the contactor 39 in a conventional manner, with a normally-open auxiliary contact 39b of the contactor 39 arranged in parallel with the push-button 42 to provide a holding circuit.

The operation of the timing devices 9, 9a, and 9b will now be explained. Referring to FIG. 1, the timing device 9 obtains its operating signal from the shunt 23 as mentioned, the voltage across the shunt 23 being applied to the primary winding 20p of the transformer 20 by means of the conductors 24. When the shunt 23 is placed in series with the armature of a motor, as indicated by the location of the shunts 23a and 23b in the circuit of FIG. 2, the magnitude of the voltage across the shunt 23 is proportional to the current drawn by the motor. The magnitude of the voltage across the shunt 23 determines the amount of current in the primary winding 20p of the transformer 20. The secondary winding 20s of the transformer 20 is connected directly across the emitter 22e and the base 22b of the transistor 22 so that, with the transformer 20 having those of its terminals of like polarity indicated by the dots in FIG. 1, a signal voltage across the shunt 23 of the polarity shown and above a predetermined minimum magnitude causes the emitter 22e to be of positive polarity relative to the base 22b, thereby causing the emitter-collector circuit of the transistor 22 to be conductive. When the transistor 22 is conductive, current flows from the conductor 10 through the resistor 12, the diode 13, and the junction 28, the conductor 27, the emitter 22e, the collector 22c, and the winding 31w of the relay 31 to the conductor 11. Therefore, a signal voltage above a predetermined minimum magnitude across the shunt 23 causes the transistor 22 to be conductive and thereby to cause energization of the relay 31. When the predetermind minimum magnitude of the signal voltage is exceeded, the additional current in the secondary winding 20s of the transformer 20 further saturates the transistor 22 maintaining the relay 31 energized. When the magnitude of the voltage signal across the shunt 23 falls below the predetermined minimum value, the voltage at the secondary winding 20s is insufficient to permit the emitter-collector junction of the transistor 22 to remain conductive and the relay 31 becomes deenergized.

The core 20c of the transformer 20 is made of saturable material so that when a signal voltage of at least the predetermined minimum magnitude is applied to the primary winding 20a, it will cause the core 20c to saturate after a period of time. When saturation of the core 20c occurs, voltage no longer appears at the secondary winding 20s and consequently the emitter-collector circuit of the transistor 22 becomes non-conductive. Such turning off of the transistor 22 causes deenergization of the relay 31 as has been explained. Because the emitter-base junction of the transistor 22 is connected directly across the secondary winding 20s, the voltage across the secondary winding 20s is independent of the secondary current and thus is substantially constant, thereby to provide a substantially uniform time for saturation of the core 20c. Therefore, if the voltage signal across the shunt 23 fails to decrease below the predetermined minimum value within a predetermined time interval, saturation of the core 20c of the transformer 20 occurs and causes the transistor 22 to become non-conductive and thereby effect deenergization of the relay 31.

Because the transformer 20 is saturable, it is necessary to reset the core 20c after each operation of the device 9. For example, if a voltage signal were applied to the primary winding 20p after a preceding operation in which saturation of the core 20c and deenergization of the relay 31 had occured, the device 9 would be inoperative because of the inability of the secondary winding 20s to support voltage. Further, if deenergization of the relay 31 occurs prior to saturation of the core 20c, as previously explained, the core 20c would remain in an undesired partially-saturated state if it were not reset prior to a subsequent application of a voltage signal. In such case, the core 20c, on subsequent application of a voltage signal, in some instances would become prematurely saturated and cause premature deenergization of the relay 31. Resetting of the core 20c during absence of a signal voltage of said predetermined minimum value is accomplished by the circuit including the resistor 12, the conductor 29, the resistor 21, the secondary winding 20s, the conductor 27, and the zener diode 15. The voltage across the diode 13, reduced by the resistor 21, is thus applied across the secondary winding 20s. The polarity of this voltage is opposite to the polarity of the voltage induced in the transformer secondary 20s by the signal voltage from the shunt 23 and is thus operative to reset the core 20c. The resetting voltage depends on the voltage drop across the diode 13 as adjusted by the resistor 21 and should be sufficient to set the flux in the core at a value which will cause the proper time delay before saturation on the next operation. Because this voltage drop is essentially constant, regardless of supply voltage fluctuations, the resetting voltage applied to the transformer secondary 20s is substantially the same for each successive resetting operation. It is to be noted that the required resetting voltage could also be provided by other means, such as replacing the diode 13 by an adjustable resistor.

The resistor 12 is provided to limit the current in the zener diode 15 to a safe value, and the zener diode 15 not only provides a regulated voltage supply, but also serves to limit the voltage which the transistor 22 must block when it is in its non-conductive state.

The operation of the motor control system of FIG. 2 will now be explained with reference to FIG. 3 and FIG. 4. Closure of the start push-button 42 causes energization of the winding 39w and consequent closure of the contacts 39a and 39b. Closure of the contact 39b maintains the winding 39w energized after reopening of the push-button 42. When the contact 39a closes, current flows from the conductor 10 through the overload relay winding 38w, the contact 39a, the armature winding 33a, the series field winding 33f, the resistor portions 34a and 34b, and the shunt 23a to the conductor 11. Upon initiation of current flow in the shunt 23a, the voltage across the shunt 23a causes the timing device 9a to start a timing operation and to effect immediate energization of the winding 40w of the relay 40. Energization of the winding 40w and consequent opening of the normally-closed contact 40c prevent energization of the winding 35w at this time because the speed of response of relay 40 is more rapid than that of the contactor 35. Under normal operating conditions, the motor current now rises to a value as shown by a point 44 on the curve of FIG. 3, and then decreases, as shown, as soon as the armature winding 33a starts to rotate because of the counter E.M.F. generated thereby. The rate of reduction of the motor current depends upon the rate of acceleration of the armature 33a, the rate of reduction being greater the more rapidly the armature 33a accelerates.

Figure 3:
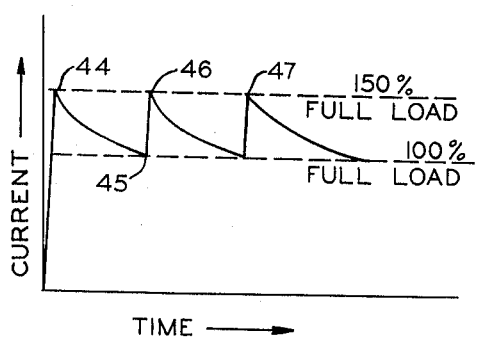
FIG. 3 is a graph representing motor current variations during the operation of the system of FIG. 2 under normal conditions.

As the armature 33a accelerates, the motor current, which also is now flowing through the shunt 23a decreases to a value indicated by point 45 in FIG. 3. The time required for the current to decrease to this value depends, of course, on the rate of acceleration of the armature 33a. It will be understood that if the armature accelerates rapidly, there will be a rapid decrease in the current in the shunt 23a to the value indicated by the point 45. If, on the other hand, the armature accelerates slowly, the time interval which will elapse before current decreases to the value shown at point 45 will be greater.

Assuming the value of current, indicated by point 45, to be such that the voltage across the shunt 23a is the predetermined minimum voltage magnitude below which the transistor 22 of the timing device 9a becomes non-conductive, the winding 40w will thereupon become deenergized, whereupon the contact 40c closes and permits energization of the winding 35w. Energization of the winding 35w results in closure of the contact 35a causing the portion 34a of resistor 34 to be by-passed, thereby applying a higher voltage across the armature winding 33a. Thereupon, current in the motor circuit increases to a value shown by a point 46 on the curve of FIG. 3 to cause further acceleration of the motor 33. Upon closure of the contact 35a, the shunt 23b starts to carry the motor current. The voltage signal applied to the transformer 20 of the timing unit 9b immediately goes above the predetermined minimum value and the relay 41 opens its contact 41c before the closure of the normally-open contact 35b of the contactor 35 can cause operation of the contactor 36. Normally, the motor continues to accelerate and the current in the shunt 23b decreases. When the voltage across the shunt 23b decreases to the predetermined minimum value, the transistor 22 in the timing device 9b ceases to conduct and the relay 41 is deenergized. Resultant closure of the contact 41c causes energization of the winding 36w through the contacts 39a and 35b. The contact 36c thereupon closes to by-pass the resistor portion 34b. The motor current again increases as shown by a point 47 and then decreases to a value determined by the load on the motor. As previously explained, as soon as the respective transistors 22 of the units 9a and 9b become non-conductive, the cores 20c of respective transformers 20 are reset for subsequent operation.

It should be noted that closure of the contact 35a by-passes the shunt 23a and closure of the contact 36c by-passes the shunt 23b. This insures that these shunts carry current only during the acceleration period and that the devices 9a and 9b are inoperative after the respective contacts 35a and 36c close.

Figure 4:
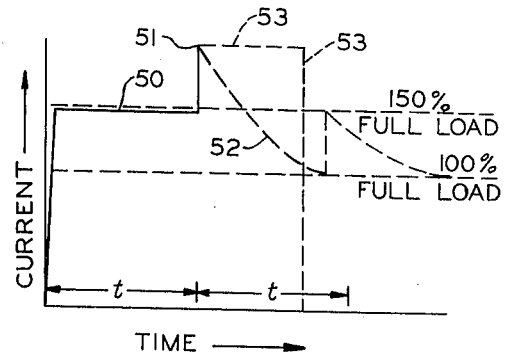
FIG. 4 is a similar graph of motor current variations during the operation of the system of FIG. 2 under abnormal conditions.

If the motor 33 should fail to start upon closure of the contact 39a because of excessive friction or for any other reason, the current in the motor circuit will not decrease, but will be maintained at a value shown by a portion 50 of the curve in FIG. 4, which value is limited only by the resistance of the armature circuit. At the end of a predetermined time interval $t$, the core 20c of the transformer 20 of the timing device 9a saturates and the winding 40w becomes deenergized, resulting in closure of the contact 40c as previously explained. Consequent energization of coil 35w and closure of contact 35a causes the resistor portion 34a to be by-passed, a during normal acceleration. If the armature 33a has not yet begun to rotate, the current in the armature circuit will rise sharply to the value indicated by a point 51 on the curve of FIG. 4. At this time the torque produced by the excess current through the motor 33 will either cause the armature 33a to overcome the friction, or other cause of the stall, and to begin rotation, thereby causing the current to decrease, as along the curve portion 52, to the value at which the remaining step of acceleration will be accomplished, or, after a further time interval, the overload relay 38 will operate and cause the motor to be deenergized by opening of the contact 38c with consequent deenergization of the winding 39w. The motor current then follows the broken line 53 in FIG. 4.

It should be noted that the timing device 9, shown in FIG. 1 and described above, is polarity sensitive; that is, it will operate properly only when the polarity of the voltage applied to the transformer primary 20p is as indicated across the shunt 23 in FIG. 1. Also, for proper operation of the timing device 9, the conductors 10 and 11 must be respectively positive and negative. For certain applications, it is desirable to use a timing device which operates properly regardless of the polarity of the operating signal across the shunt. The embodiment of the timing device shown in FIG. 5 will operate properly regardless of the voltage across the shunt 23. It is to be noted that the control unit 59 of FIG. 5 contains units 19 and 19' which are duplicates of the unit 19 of FIG. 1.

Figure 5:
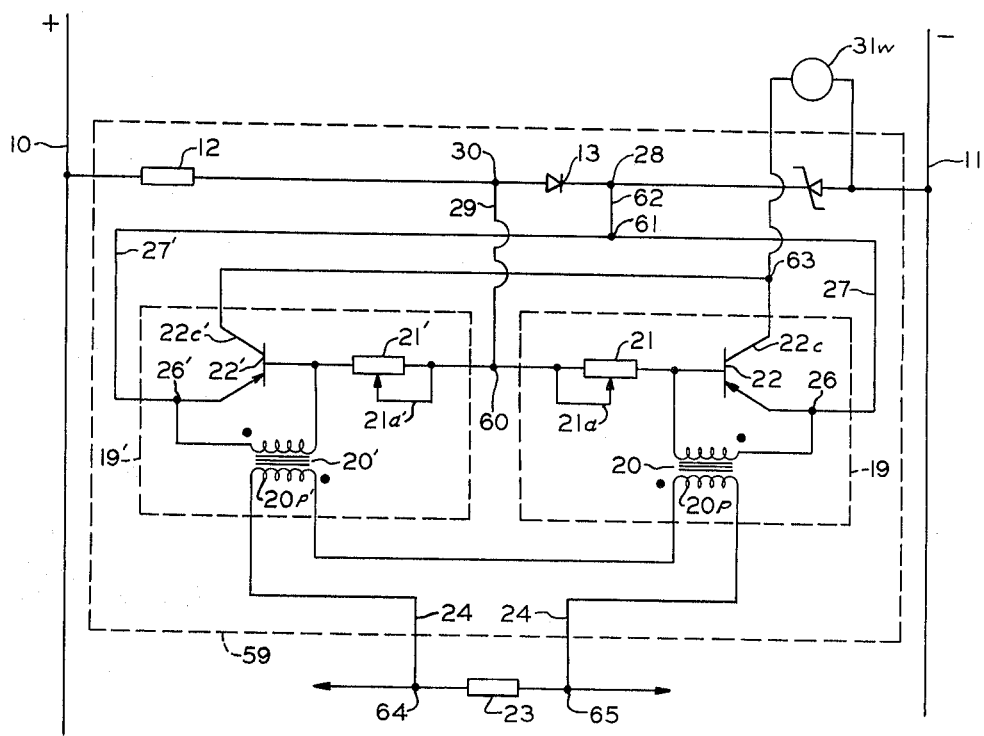
FIG. 5 is a schematic wiring diagram of another embodiment of the time delay device.

Referring now to FIG. 5, it will be seen that the electro-responsive unit 19' is identical in all respects to the previously described unit 19. The components in the unit 19' have been given the same numerical designation as their respective components in the unit 19 with the addition of a prime designation. That is, resistor 21', in the unit 19', is the equivalent of resistor 21 in the unit 19.

The resistors 21 and 21' are electrically connected at a junction 60 on the conductor 29 which is further connected to the junction 30 intermediate the resistor 12 and the diode 13. The junctions 26 and 26' are interconnected at a junction 61 by conductors 27 and 27'. The junction 61 is connected with the junction 28 by a conductor 62. The collectors 22c and 22c' of the transistors 22 and 22', respectively, are electrically interconnected at a junction 63 which is electrically connected to the operating winding 31w of the relay 31. The primary windings 20p and 20p' of the transformers 20 and 20', respectively, are serially electrically connected, which series connection is connected in parallel with the shunt 23.

The unit 19 will operate only when the polarity of the voltage applied to the primary winding 20p is such that the end of the winding 20p adjacent its polarity dot is positive with respect to its other end; and, the unit 19' will operate only when the polarity of the voltage applied to the primary winding 20p' is such that the end of winding 20p' adjacent the polarity dot is positive with respect to its other end. The units 19 and 19' are parallel connected and the remainder of the components, such as the resistor 12, diode 13, zener diode 15, and winding 31w, are electrically connected to the aforesaid parallel combination so that the timing device 59 operates in similar fashion to device 9 of FIG. 1. When end 64 of the shunt 23 of FIG. 5 is positive with respect to end 65, the unit 19 controls the operation of the relay 31. When the end 65 of the shunt 23 is positive with respect to the end 64, the unit 19' controls operation of the relay 31. The operation of each of the units 19 and 19' is identical to that previously explained for the unit 19 of FIG. 1.

Having thus described our invention, we claim:

1. A combined time limit and current responsive acceleration control system for a direct current motor, said system comprising a direct current motor having an armature winding, a resistive shunt, means for connecting the armature winding and the shunt in series with each other across a source of unidirectional voltage, a saturable transformer having a primary winding, a secondardy winding and a saturable core, a voltage-responsive switching means connected to the secondary winding and responsive to the voltage at said secondary winding to change from a first operative condition to a second operative condition thereby to control the voltage applied to said armature winding from said source, said primary winding being connected in parallel with said shunt thereby to be supplied with a voltage signal which is directly related to the armature current of the motor and which appears across said shunt, said voltage signal decreasing, when the motor accelerates within a time less than a predetermined time requirded to saturate the core, from a first value sufficient for causing the switching means to assume said first condition to a second value causing the switching means to assume said second condition, the flux resetting means for establishing a flux value in said core, prior to application of said voltage signal, such that said voltage signal causes saturation of said core resulting in said switching means assuming said second condition if the motor does not accelerate sufficiently to cause the voltage signal to decrease to said second value in less than said predetermined time.

2. A control system according to claim 1 wherein the resetting means comprises a resistor and means connecting said secondary winding in series with said resistor across a voltage source.

3. A control system according to claim 1 wherein the system includes a control circuit for the motor and the voltage responsive switching means includes an electro-responsive relay having contacts in said control circuit.

4. A control system according to claim 3 wherein said voltage responsive switching means additionally includes a transistor having an emitter, a base, and a collector, said emitter and base are connected across said secondary winding, and the relay has a winding connected in series with the emitter-collector circuit of the transistor so as to render the relay responsive to the voltage at the secondary winding.

References Cited by the Examiner

UNITED STATES PATENTS

| | | | |
|---|---|---|---|
| 1,805,491 | 5/1931 | Kuhn | 318—395 |
| 2,649,557 | 8/1953 | Ransom | 317—148 X |
| 2,921,241 | 1/1960 | McFarland | 317—148 |
| 2,957,111 | 10/1960 | Schaeve et al. | 317—148.5 |
| 3,018,416 | 1/1962 | Karlicek et al. | 317—148 X |
| 3,177,402 | 4/1965 | Muchnick et al. | 317—148 X |

FOREIGN PATENTS 864,755  4/1961  Great Britain.

ORIS L. RADER, *Primary Examiner.*

S. GORDON, G. SIMMONS, *Assistant Examiners.*